United States Patent Office 3,094,604
Patented June 18, 1963

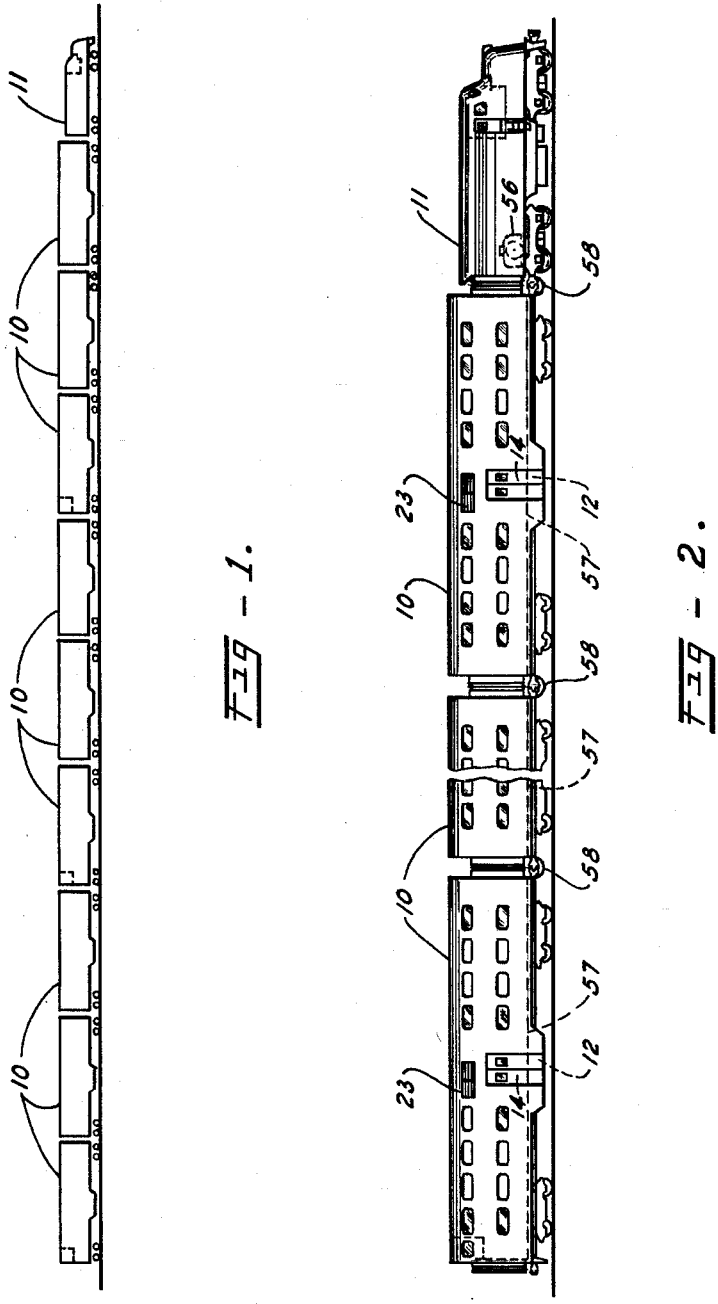

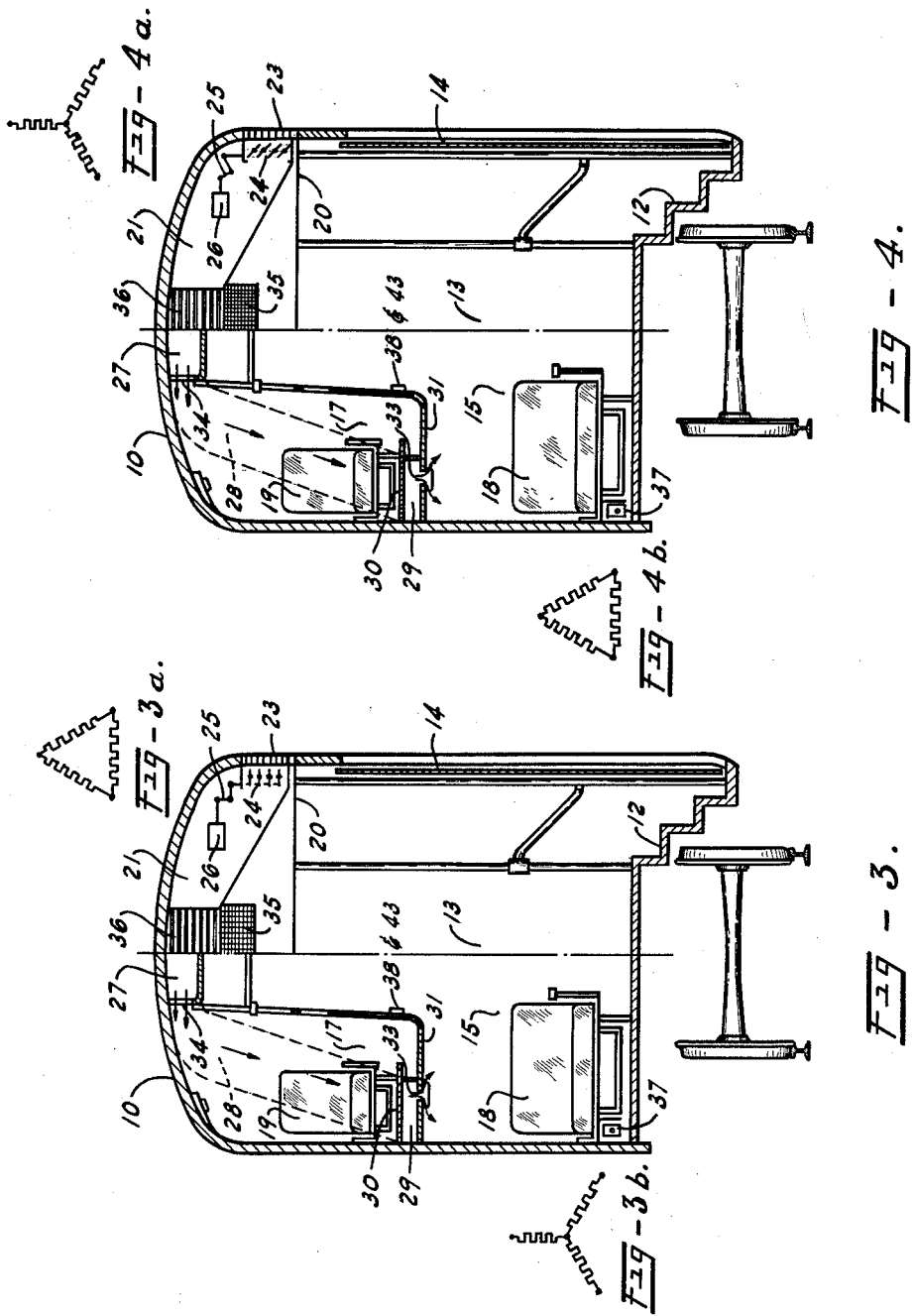

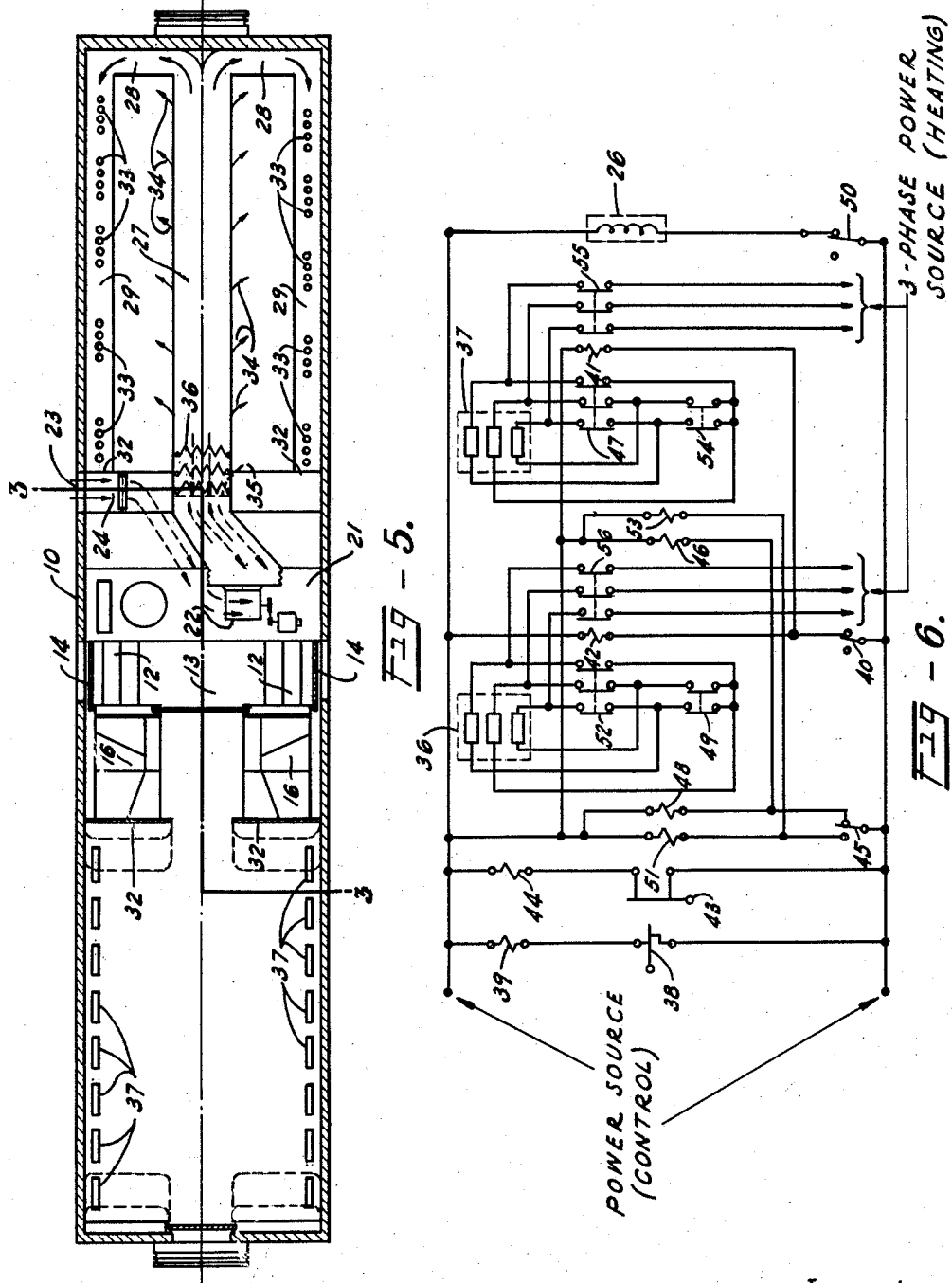

3,094,604
VEHICLE ELECTRIC HEATING SYSTEM
William Van Der Sluys, Homewood, Ill., and John L. Swarner, Valparaiso, Ind., assignors to Pullman Incorporated, Chicago, Ill., a corporation of Delaware
Filed Aug. 12, 1960, Ser. No. 49,257
8 Claims. (Cl. 219—20)

This invention relates to an electric heating system for a vehicle having a passenger compartment and particularly adapted for use in high-capacity passenger vehicles.

The invention relates more particularly to an electric heating system for a high-capacity passenger car wherein interlocked heating and fresh air controls are employed to control the car temperature and the amount of fresh air admitted into the car to maintain good heat conditions in the car for passenger comfort with the amount of electrical power consumption remaining constant at all times.

The prior patent art discloses a number of electric heating systems having heat control arrangements for use in vehicles including railway passenger cars. Arrangements having overhead heat and floor heat, and motor-operated fresh air dampers also are disclosed. Generally these systems include thermostatic controls which operate in accordance with set limits of car temperature to vary the amount of electrical power furnished to the car, thereby providing several conditions of heat output into the car, such as, a maximum heat output, or heat fully on, when the car temperature is below the set limit and either a low heat output, or heat all off, when the car temperature is above the set value. In the low heat condition of the first arrangement certain heating elements of the system are in heat off position which results in having alternate hot and cold spots in the car. Obviously this situation is undesirable from the standpoint of passenger comfort. Frequent cycling between the heat all off and the heat fully on is required in the second arrangement and this, too, is undesirable with respect to passenger comfort. These undesirable conditions are avoided in the present invention since the amount of electrical power consumed by the system remains constant for all heat conditions in the car and all heating elements of the system are in use at all times when heat is required in the car. The fresh air intake damper of the invention is interlocked with the heat controls and operates automatically with changes in the heat output of the heating elements, admitting varying amounts of fresh air into the car in accordance with car temperature demand.

A principal object of the invention is the provision of an electric heating system for high-capacity passenger vehicles wherein the amount of electrical power consumed by the system remains constant for all heat conditions in the vehicle.

An important object of the invention is the provision of an electric heating system for high-capacity passenger vehicles wherein all the heating elements of the system are in use when heat is required in the vehicle.

Another object of the invention is the provision of an electric heating system for passenger vehicles adapted to maintain maximum heating comfort regardless of passenger density.

A more specific object of the invention is the provision of an electric heating system for a passenger car including a motor-operated fresh air intake damper, overhead and floor electrical heating elements and interlocking controls whereby the amount of fresh air admitted into the system is varied and the overhead and floor heating elements are controlled to provide either high or low heat output, respectively, in accordance with car temperature demand, and the electrical power load required by the system maintained constant for all heat conditions in the car.

A further specific object of the invention is the provision of an electric heating system for a two-level, high-capacity coach type car including motor-operated fresh air intake dampers to admit varying amounts of fresh air into an air-distributing duct system, electrical heating elements in the duct system to add heat to the mixture of fresh and recirculated air before distribution into the car, floor electrical heating elements providing radiant and convected heat in the car and thermostatic controls whereby with a light passenger load the fresh air dampers are partially closed to admit a predetermined amount of fresh air, the duct system and floor heating elements are connected to provide low and high heat output, respectively, and with a heavy passenger load the components automatically changing so that the fresh air dampers are opened to admit an increased amount of fresh air, the duct system and floor heating elements are connected to provide high and low heat output, respectively, and the electrical power load required by the system maintained constant for all heat conditions in the car.

A still further and important object of the invention is the provision of an electric heating system for a train of high-capacity passenger cars including a motive power unit having an auxiliary diesel generator providing electric power for the heating system and the electric power load for the heating system in each car being predetermined and maintained constant when heat is required whereby to provide a train including a maximum number of cars utilizing substantially the full capacity of the auxiliary diesel generator.

The foregoing and other objects of the invention are attained by the arrangement illustrated in the accompanying drawings wherein FIG. 1 is a side elevational view showing a train of high-capacity passenger cars including a motive power unit at one end and in which train the heating system of this invention is provided;

FIG. 2 is a fragmentary side elevational view showing the cars and motive power unit of FIG. 1 to a larger scale;

FIG. 3 is a cross-sectional view through the cars taken on lines 3—3 in FIG. 5 and shows the fresh air intake damper in open position with the overhead and floor heating elements connected to provide high and low heat output respectively;

FIG. 3a is a schematic illustration of the delta connection of the overhead electrical heating elements;

FIG. 3b is a schematic illustration of the Y connection of the floor electrical heating elements;

FIG. 4 is also a cross-sectional view through the cars the same as FIG. 3 but shows the fresh air intake damper in partially closed position with the overhead and floor heating elements connected to provide low and high heat output respectively;

FIG. 4a is a schematic illustration of the Y connection of the overhead electrical heating elements;

FIG. 4b is a schematic illustration of the delta connection of the floor electrical heating elements;

FIG. 5 is a plan view of one of the cars in FIGS. 1 and 2 wherein the right half of the drawing shows the upper level portion of the car and the left half of the drawing the lower level portion; and FIG. 6 is a schematic circuit diagram of the controls for the heating system.

The heating and fresh air controls of this invention are interlocked so as to provide for several heating conditions. One of these conditions exists when temperatures outside of the car are at 0° F. or below and the car is being warmed up prior to its being placed in service, or is operating in service with a light passenger load. During this heating cycle the fresh air intake dampers are partially closed to admit a predetermined amount of fresh air and the overhead and floor electrical heating elements are connected to provide low heat output and high heat output respectively. This heating condition requires only a minimum amount of fresh air for ventilation and the low heat output of the overhead heating elements is adequate to warm the air on entry, while the high heat output of the floor heating elements maintains the car body temperature. This arrangement of car heating is maintained until the temperature inside of the car reaches a predetermined comfort value of, say for example, 60° F.

A second heating condition exists when the temperature inside of the car is above the predetermined value of 60° F., and the car operating in service with a heavy passenger load utilizing passenger heat when the temperatures outside of the car are low, or when the temperatures outside of the car are high enough to raise the temperature inside of the car to 60° F. or higher regardless of the passenger load. In this situation the thermostatic controls automatically open the fresh air intake dampers to admit an increased amount of fresh air and change the overhead and floor heating elements to high heat output and low heat output respectively.

Thus it can be seen that the control compensates for passenger load by reducing fresh air during light passenger loads or warm-up periods. When passenger load is high, the heat from the passengers is used to assist the floor heat in maintaining car temperature and a larger amount of fresh air is introduced to assist in proper ventilation.

It can also be seen that with the operation of the inventive system, the total heat output to the car can never exceed the predetermined value, and since the heat output is directly proportional to kilowatt input to the heating elements, the electrical load can never exceed a certain value and is maintained constant for all heating conditions, yet the combination of elements, and the control, provide car comfort conditions to suit operation conditions.

In accordance with one form of embodiment of the invention, the train, shown in FIGS. 1 and 2 of the drawings, is made up of nine two-level, high-capacity passenger cars 10 with a motive power unit 11 at one end. Each car has stationary entrance steps 12 and a vestibule 13 with sliding doors 14 at the longitudinal center of the car from which entrance is made to either coach compartment adjacent the respective opposite ends of the vestibule. The lower level portions 15 of the coach compartments extend across the width of the car. Stairways 16 are provided adjacent each end of the steps 12, each leading up to one of the four upper level sections 17 located on each side of the car. Throwover type passenger seats are provided in the car, two-passenger type 18 on each side of the center aisle in the lower level sections 15 and single-passenger type 19 in each upper level section 17.

Above the center vestibule ceiling 20 is a compartment 21 which houses the air-conditioning equipment provided for the car; consisting of two electro-mechanical units, operating individually for each coach compartment, including a motor-blower unit 22 for distributing the air into the compartment. On each side of the car is a fresh air intake opening 23 equipped with an adjustable damper arrangement 24 which varies the amount of air admitted for each compartment as hereinafter described. The damper 24 is adjusted by means of a linkage arrangement 25 connecting the damper to an electric motor 26.

An air-distributing duct system is provided in each coach compartment and since they are both identical, except for right-hand and left-hand connections to the air-conditioning units, it will be sufficient to describe only one system for one compartment, it being understood that the components are the same for both systems. The centrally located longitudinal duct 27 in the ceiling of the upper level of the coach compartment is connected at one end to the motor-blower unit 22 and extends to the end of the car where it is connected to two downwardly and outwardly sloping ducts 28, one on each side portion of the car. The lower ends of ducts 28 are each connected to a longitudinal duct 29 disposed between the seat platform 30 of the upper level section 17 and the ceiling 31 of the lower level section 13. Ducts 29 extending from ducts 28 at the end of the car to the stairway bulkheads 32 are provided with a plurality of openings 33 in ceiling 31 for distribution of air into the lower level section 13. Openings 34 are provided in the vertical side walls of duct 27 for distribution of air into the upper level sections 17. A recirculated air opening 35 is provided in a vertical wall portion of the overhead compartment 21. After passing through the recirculated air opening 35, the air from the coach compartment is mixed with the fresh air admitted through the opening 23 in a plenum chamber located underneath and connected to the motor-blower unit 22 from which the mixed air is then distributed into the coach compartment by means of the duct system described above.

Electrical heating elements 36 are provided in duct 27 adjacent the overhead compartment 21 which add heat to the mixed recirculated and fresh air before the air is distributed into the coach compartment. A plurality of electrical heating elements 37 is provided at the lower lever floor along each side wall of the compartment. These floor heating elements provide radiant and convected heat in the compartment in conjunction with the heated air from the duct system in accordance with car temperature demands as hereinafter explained.

From the description thus far it can be noted that each coach compartment has its own heating system which operates independently of the system provided for the other coach compartment. Generally each system is divided into two parts, viz., overhead electrical heating elements 36 which add heat to the mixture of fresh and recirculated air entering the compartment, and floor heating elements 37 which provide radiant and convected heat at the lower level floor along the sides of the compartment.

The electrical power source for the heating system is 3-phase alternating current supplied by an auxiliary power unit 56 which is located in motive power unit 11. The electrical power is transmitted through the cars by train-line 57 on each car and jumper cable connections 58 between cars. The heating elements have two methods of connection, one a "delta" connection which allows the full voltage across the heaters thus providing maximum rated heat output (high), and the other a Y connection which reduces the heat output (low) to approximately ⅓ of the rated maximum. The heating system also includes a control panel, which receives its intelligence from thermostats inside the car body and connects the heating elements according to passenger load, fresh air temperature, and car body temperature; and a motor-operated fresh air damper 24 which admits fresh air to the car in accordance with car temperature demand.

FIGS. 3 and 4 illustrate the two heating conditions provided for by the controls of the heating system, as explained above, wherein FIG. 3 the fresh air damper 24 is shown in open position, the overhead heating elements 36 are delta connected, as schematically indicated in FIG. 3a, to provide high heat output, and the floor heating elements 37 are Y connected, as schematically indicated in FIG. 3b, to provide low heat output. In FIG. 4 where the fresh air damper 24 is shown in partially closed position, the overhead heating elements 36 are Y connected, as schematically indicated in FIG. 4a, to provide low heat output, and the floor heating elements 37 are delta connected schematically, as indicated in FIG. 4b, to provide high heat output.

Reference is now made to FIG. 6 which is a schematic circuit diagram of the electric controls covering one coach compartment. A similar circuit is provided for the other coach compartment of the car, so that, as explained above, the two heating systems operate independently of each other. The heat thermostat 38 measures the car temperature and keeps the heat relay 39 de-energized when the car temperature is below a specified setting. The heat relay contact 40 is closed in the de-energized position of relay 39 which allows current to flow through the overhead and floor heat contactor coils, 41 and 42, respectively, and the two heat contactors, 55 and 56, are closed to the heating power source. This sets up the circuit so that the heat selector thermostat 43 can control the heating elements to provide either high or low heat output. The heat selector thermostat 43 keeps the heat selector relay 44 de-energized as long as the car temperature remains below a predetermined setting, say 60° F. The heat selector relay contact 45, normally closed in the de-energized position, energizes the floor heat relay 46 which closes the floor heat relay contacts 47 for the delta connection or high heat output on the floor heating elements 37. At the same time the overhead heat relay 48 is energized, causing contacts 49 to close placing the overhead heating elements 36 on the Y connection or low heat output. The selector relay 45 also has a closed contact 50 in the de-energized position which puts power on the fresh air damper motor 26 causing the damper 24 to partially close restricting the amount of fresh air entering the car.

When the car temperature reaches 60° F., the heat selector relay 39 is energized through the selector thermostat 38 which opens the contact 50 to the fresh air damper motor 26, allowing the damper 24 to open to admit an increased amount of fresh air. At the same time, the selector relay contact 45 opens the circuit to the overhead heat relay 48 (low heat output), which opens contacts 49. The selector relay contact 45 closes to energize the overhead heat relay 51 which closes contacts 52 placing the overhead heating elements 36 on the delta connection or high heat output. When the selector relay contact 45 operates as described above, it also opens the circuit to the floor heat relay 46 (high heat output) and closes the circuit to the floor heat relay 53 which causes contacts 47 to open and contacts 54 to close placing the floor heating elements 37 on the Y connection or low heat output.

Heating systems as disclosed herein have been provided on a number of trains of the size and type described and these trains are now in service and operating on major railroad lines in the United States. It has been demonstrated that the novel arrangement of interlocking the controls for the heating and the fresh air intake, as contemplated by this invention, reduces the peak electrical load required per car for heating, to an extent that the load required for heating systems having controls arranged in accordance with the invention, permits a substantially increased number of cars to be used in a train, without any increase in the capacity of the auxiliary power unit supplying the electrical power for heating the train as provided in the usual motive power unit.

What is claimed is:

1. An electric heating system for an enclosure having means for admitting fresh air therein, said system comprising a motor-operated fresh air intake damper, two separate heating elements within said enclosure, a power source supplying a predetermined maximum amount of power to said system, an interlocking control circuit connecting said power source with said damper motor and each said heating element through either a delta or a Y connection, said control circuit regulating said damper and said delta and Y connections to adjust the amount of fresh air admitted to said system and to form respectively either a delta-Y or a Y-delta pair of connections for said heating elements in accordance with temperature demand in said enclosure whereby said system consumes a constant power load substantially equal to said maximum power supply at all times during operation to heat said enclosure.

2. An electric heating system for an enclosure comprising in combination, means for distributing air into said enclosure including a duct having a fresh air intake, a motor-operated damper at said intake, separate first and second heating elements within said enclosure disposed respectively inside and outside of said duct, a power source supplying a predetermined maximum amount of power to said system, interlocking control means connecting said power source with said damper motor and each said heating element through either a delta or a Y connection, said control means regulating said damper and said delta and Y connections to adjust the amount of fresh air admitted to said system and to put said first and second heating elements in either respectively opposite delta-Y or Y-delta pair of connections in accordance with temperature demand in said enclosure whereby the power load consumed by said system in maintained constant to substantially equal said maximum power supply for all heating conditions in said enclosure.

3. In an enclosure having oppositely spaced side walls, a floor, a ceiling and means adjacent said ceiling for distributing air into said enclosure including a duct having a fresh air intake, an electric heating system comprising a motor-operated damper at said fresh air intake, an overhead heating element disposed within said duct, a floor heating element disposed within said enclosure adjacent each junction of said side walls with said floor, a 3-phase A.C. power source supplying a predetermined maximum amount of power to said heating system, interlocking control means connecting said power source with said damper motor and said heating elements including a delta and a Y connection between said power source and each said overhead and floor heating element, said control means regulating said damper to adjust the amount of fresh air admitted to said system and controlling said overhead and floor heating elements to connect them in pairs through said delta and Y connections to form respectively either a delta-Y or Y-delta combination in accordance with temperature demand in said enclosure whereby the electrical power load consumed by said system is maintained constant to substantially equal said maximum power supply for all heating conditions in said enclosure.

4. In an enclosure having oppositely spaced side walls, a floor, a ceiling and means adjacent said ceiling for distributing mixed fresh and recirculated air into said enclosure, said means including an air duct having a fresh air intake, an electric heating system for said enclosure comprising a motor-operated fresh air damper, an upper heating element disposed within said air duct, a lower heating element disposed along each junction of said side walls with said floor, a 3-phase A.C. power source supplying a predetermined maximum amount of power to said heating system, said upper and lower heating elements each having a delta and a Y connection to said power source, an interlocking control circuit regulating said damper to adjust the amount of fresh air admitted to said system and controlling said upper and lower heating elements to connect them to said power source through said delta and Y connections to form respectively either a delta-Y pair of a Y-delta pair in accordance with temperature demand in said enclosure whereby the electrical power load consumed by said system is maintained constant to substantially equal said maximum power supply for all heating conditions in said enclosure.

5. In a heating system adapted to provide for a first and a second temperature condition in an enclosure having oppositely spaced side walls, a floor, a ceiling and means adjacent said ceiling for distributing air into said enclosure including a duct having a fresh air intake, an electric heating arrangement comprising a motor-operated damper at said intake, an overhead heating element disposed within said duct, a floor heating element disposed within said enclosure adjacent each junction of said side walls with said floor, a power source supplying a predetermined maximum amount of power to said heating system, and an interlocking control circuit connecting said power source with said damper motor and said heating elements including thermostatic means and a delta and a Y connection between said power source and each said overhead and floor heating element to provide respectively high or low heat output of said elements, said control circuit being thermostatically responsive to said first temperature condition to connect said overhead and floor heating elements with said power source in a Y and a delta connection respectively and responsive to said second temperature condition to connect said overhead and floor heating elements to said power source in a delta and a Y connection respectively, and said control circuit simultaneously operating said damper motor causing said damper to restrict the amount of fresh air admitted during said first condition and causing said damper to open to admit an increased amount of fresh air during said second condition whereby the electrical power load consumed by said heating system is maintained constant to substantially equal said maximum power supply for both said temperature conditions in said enclosure.

6. In a vehicle passenger compartment having oppositely spaced side walls, a floor, a ceiling and means adjacent said ceiling for distributing air into said compartment including a duct having a fresh air intake, an electric heating system comprising a motor-operated damper at said fresh air intake, an overhead heating element disposed within said air duct, a floor heating element disposed within said compartment adjacent each junction of said side walls with said floor, a power source supplying a predetermined maximum amount of power to said heating system, interlocking control means connecting said power source with said damper motor and each said heating element through either a delta or a Y connection, said control means regulating said damper to adjust the amount of fresh air admitted to said system and controlling said overhead and floor heating elements to connect them to said power source in pairs through said delta and Y connections to form respectively either a delta-Y or a Y-delta connection combination in accordance with temperature demand in said compartment whereby the electrical power load consumed by said system is maintained constant to substantially equal said maximum power supply at all times during operation to heat said compartment.

7. A heating system for a vehicle passenger compartment having oppositely spaced side walls, a floor, a ceiling, a fresh air intake and means adjacent said ceiling for distributing mixed fresh and recirculated air into said compartment, said heating system adapted to provide for a first and a second temperature condition in said compartment, an electric heating arrangement comprising a motor-operated damper adapted to control the amount of fresh air admitted through said air intake, an overhead heating element disposed within said distributing means to add heat to said mixed air before distribution in said compartment, a floor heating element disposed within said compartment adjacent each junction of said side walls with said floor to provide radiant and convected heat in said compartment, a 3-phase A.C. power source supplying a predetermined maximum amount of power to said heating system, and an interlocking control circuit including thermostatic means and a delta and a Y connection between said power source and each said heating element to provide respectively high or low heat output of said elements, said control circuit being thermostatically responsive to said first temperature condition to connect said overhead and floor heating elements with said power source in a Y and a delta connection respectively and responsive to said second temperature condition to connect said overhead and floor heating elements with said power source in a delta and a Y connection respectively, and said control circuit simultaneously operating said damper motor causing said damper to restrict the amount of fresh air admitted during said first condition and causing said damper to open to admit an increased amount of fresh air during said second condition whereby the electrical power load consumed by said heating system is maintained constant to substantially equal said maximum power supply for both said temperature conditions in said compartment.

8. In a heating system adapted to provide for a first and a second temperature condition in a vehicle passenger compartment having oppositely spaced side walls, a ceiling, a lower floor extending across the full width of the compartment forming a lower level section, an upper level open gallery type section extending along each said side wall and means for distributing mixed fresh and recirculated air into said compartment including an overhead duct having a fresh air intake, an electric heating arrangement comprising a motor-operated damper adapted to control the amount of fresh air admitted through said fresh air intake, an overhead heating element in said duct to add heat to said mixed air before distribution in said compartment, a floor heating element disposed adjacent each junction of said side walls with said lower floor to provide radiant and convected heat in said compartment, a 3-phase A.C. power source supplying a predetermined maximum amount of power to said heating system, and an interlocking control circuit including thermostatic means and a delta and a Y connection between said power source and each said heating element to provide high or low heat output of said elements respectively, said control circuit being thermostatically responsive to said first temperature condition to connect said overhead and floor heating elements with said power source through a Y and a delta connection respectively, and responsive to said second temperature condition to connect the overhead and floor heating elements to the power source through a delta and a Y connection respectively, and said interlocking control circuit simultaneously operating said damper motor causing said damper to restrict the amount of fresh air admitted during said first condition and causing said damper to open to admit an increased amount of fresh air during said second condition whereby the electrical power load consumed by said heating system is maintained constant to substantially equal said maximum power supply for both said temperature conditions in said compartment.

References Cited in the file of this patent

UNITED STATES PATENTS

| | | |
|---|---|---|
| 1,223,968 | Hammond | Apr. 24, 1917 |
| 1,798,678 | Keller | Mar. 31, 1931 |
| 2,058,252 | Parsons | Oct. 20, 1936 |
| 2,519,109 | Callender | Aug. 15, 1950 |
| 2,660,407 | Le Hane | Nov. 24, 1953 |
| 2,760,725 | Dean et al. | Aug. 28, 1956 |